United States Patent

Burk

[15] 3,673,235
[45] June 27, 1972

[54] ESTERS OF N-HALOCYANOACETYL CARBAMIC ACIDS

[72] Inventor: George A. Burk, Bay City, Mich.
[73] Assignee: The Dow Chemical Company, Midland, Mich.
[22] Filed: Jan. 14, 1970
[21] Appl. No.: 2,978

[52] U.S. Cl..........................................260/465.4, 424/304
[51] Int. Cl.......................................................C07c 121/16
[58] Field of Search................................................260/465.4

[56] References Cited

UNITED STATES PATENTS

| | | | |
|---|---|---|---|
| 2,313,498 | 3/1943 | Allen et al. | 260/465.4 |
| 3,102,068 | 8/1963 | Tolbert | 260/465.4 X |
| 3,403,174 | 9/1968 | Chance et al. | 260/465.4 |
| 3,557,184 | 1/1971 | Toepfl et al. | 260/465.4 |

OTHER PUBLICATIONS

Conrad, et al., Ber., 42 (1909) pp. 735–742

Primary Examiner—Joseph P. Brust
Attorney—Griswold and Burdick, Herbert D. Knudsen and C. E. Rehberg

[57] ABSTRACT

Esters of N-halocyanoacetyl carbamic acids having the general formula

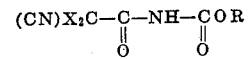

where each
  X is independently H, Cl or Br where not more than one X is H, and
  R is an alkyl of 1–10 carbon atoms
are useful as bactericides and fungicides.

6 Claims, No Drawings

ESTERS OF N-HALOCYANOACETYL CARBAMIC ACIDS

BACKGROUND OF THE INVENTION

The ethyl ester of N-cyanoacetyl carbamic acid, N-cyanoacetylurethan, was prepared by Conrad et al. as shown in Ber. 42, 742 (1909) by reacting cyanoacetic acid with urethan in the presence of acetic anhydride at 100° C.

SUMMARY OF THE INVENTION

The new esters of N-halocyanoacetyl carbamic acids having the general formula

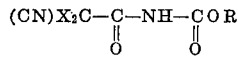

wherein each

X is independently H, Cl or Br where not more than one X is H, and

R is an alkyl of 1–10 carbon atoms are useful as bactericides and fungicides.

The compounds of the present invention are suitably prepared by slurrying the desired N-(cyanoacetyl) alkyl carbamate in an aqueous medium with barium or calcium carbonate and then halogenating the ester with bromine, chlorine or bromine chloride. In such halogenation, the bromine or chlorine selectively react with the cyanoacetyl group to form the corresponding N-mono or dihalocyanoacetyl carbamic acid ester.

Of the compounds described by the general formula, those wherein both of the X's are a halogen are preferred. Especially preferred are the compounds wherein both of the halogens are the same, with the esters of N-dibromocyanoacetyl carbamic acid being of special interest.

Also, the compounds described by the general formula having an alkyl ester group of one to five carbon atoms are preferred, with the ethyl ester being especially preferred. Of special interest is N-dibromocyanoacetylurethan, i.e., where R is ethyl and each X is Br.

The compounds of the present invention are especially useful as bactericides and fungicides. One of the marked advantages of the compounds of the present invention is their rate of decomposition, which is higher than that of a number of compounds used under similar circumstances. Because of this comparatively high rate of decomposition, pollution of streams caused by water running off of areas treated with the compound would be lessened.

SPECIFIC EMBODIMENTS

Example 1

A slurry was prepared at room temperature by mixing 7.8 g. (0.5 mole) of N-cyanoacetylurethan and 10 g. of barium carbonate (0.051 mole) in 200 ml. of water. To this slurry was added at room temperature and below 18.6 g. (0.116 mole) of bromine in a 20 minute period. The temperature was maintained at or below room temperature by adding ice internally to the reaction mixture. At the termination of the reaction, the excess bromine was reduced by the addition of a small amount of sodium bisulfite. The reaction solids were purified from wet acetone recovering N-dibromocyanoacetylurethan in 89 percent yield. The product had a melting point of 78° to 79°C. and was analyzed by infrared spectroscopy to be the monohydrate. Elemental analysis of the product as the monohydrate would theoretically give 49.5% Br, 8.9% N, 21.6% C, and 2.4% H; actual elemental analysis of the product gave percentages of 49.4, 8.95, 22.75 and 2.39 respectively.

Example 2

The N-dibromocyanoacetylurethan prepared in Example 1 was tested as a bactericide and fungicide in vitro in an agar petri dish dilution test. Agar gels containing 100 p.p.m. of the urethan were prepared, and droplets of the test organism were individually applied to the agar surface. The gels were incubated for a suitable time and then compared to a control. At this concentration, the compound of Example 1 killed 100 percent of a large number of common bacteria, such as Aerobacter aerogenes, Bacillus subtilis and Salmonella typhosa, and a large number of common fungi, such as Pullaria pullalans, Candida pelliculosa and Aspergillus terreus, whereas there was no kill with the control.

The reaction of Example 1 may also be conducted in the presence of calcium carbonate to yield the same product, and the product may be recrystallized from dry acetone or chlorobenzene to recover the anhydrous product. In the invention, the hydrate and anhydrous product are for practical purposes identical.

In the same manner as described by the examples above, N-cyanoacetylurethan may be reacted with less bromine for shorter periods of time to give the N-monobromocyanoacetylurethan. Also in the manner shown by the examples above, an excess or equimolar amount of chlorine may be substituted for the bromine in the reaction to give N-dichlorocyanoacetylurethan and N-monochlorocyanoacetylurethan. The monobromo or monochlorocyanoacetylurethan may be reacted with either chlorine or bromine respectively to give the N-monochloromonobromocyanoacetylurethan.

In the same manner as described above, other alkyl N-(cyanoacetyl)carbamates may be reacted with bromine or chlorine in a manner similar to that shown above. For example, methyl N-(cyanoacetyl)carbamate, butyl N-(cyanoacetyl)carbamate, hexyl N-(cyanoacetyl) carbamate and decyl N-(cyanoacetyl)carbamate may be substituted for the N-cyanoacetylurethan in the reactions above to give the corresponding alkyl N-(bromo, chloro and bromochlorocyanoacetyl)carbamate.

I claim:

1. An ester of N-halocyanoacetylcarbamic acid having the general formula

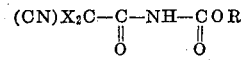

where each X is independently Cl or Br and R is an alkyl of 1–10 carbon atoms.

2. An ester of claim 1 wherein each X is the same halogen.

3. An ester of claim 2 wherein each X is bromine.

4. An ester of claim 1 wherein the R is an alkyl group of 1 to 5 carbon atoms.

5. An ester of claim 4 wherein R is ethyl.

6. The ester of claim 1 wherein R is ethyl and each X is Br.